July 9, 1963
W. A. SIMMONS
3,096,572
PIPE JOINT FABRICATING TOOL
Filed July 24, 1961
3 Sheets-Sheet 1
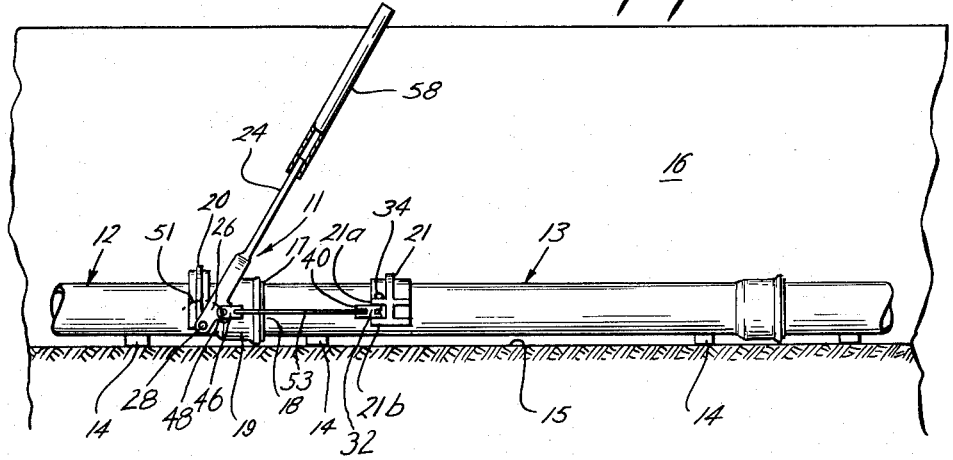
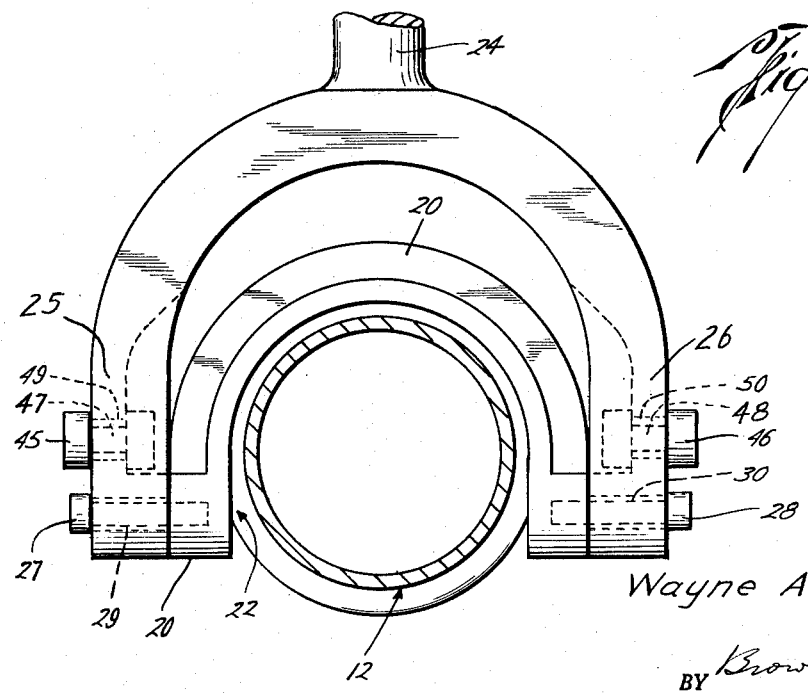
Wayne A. Simmons
INVENTOR.
BY
ATTORNEYS

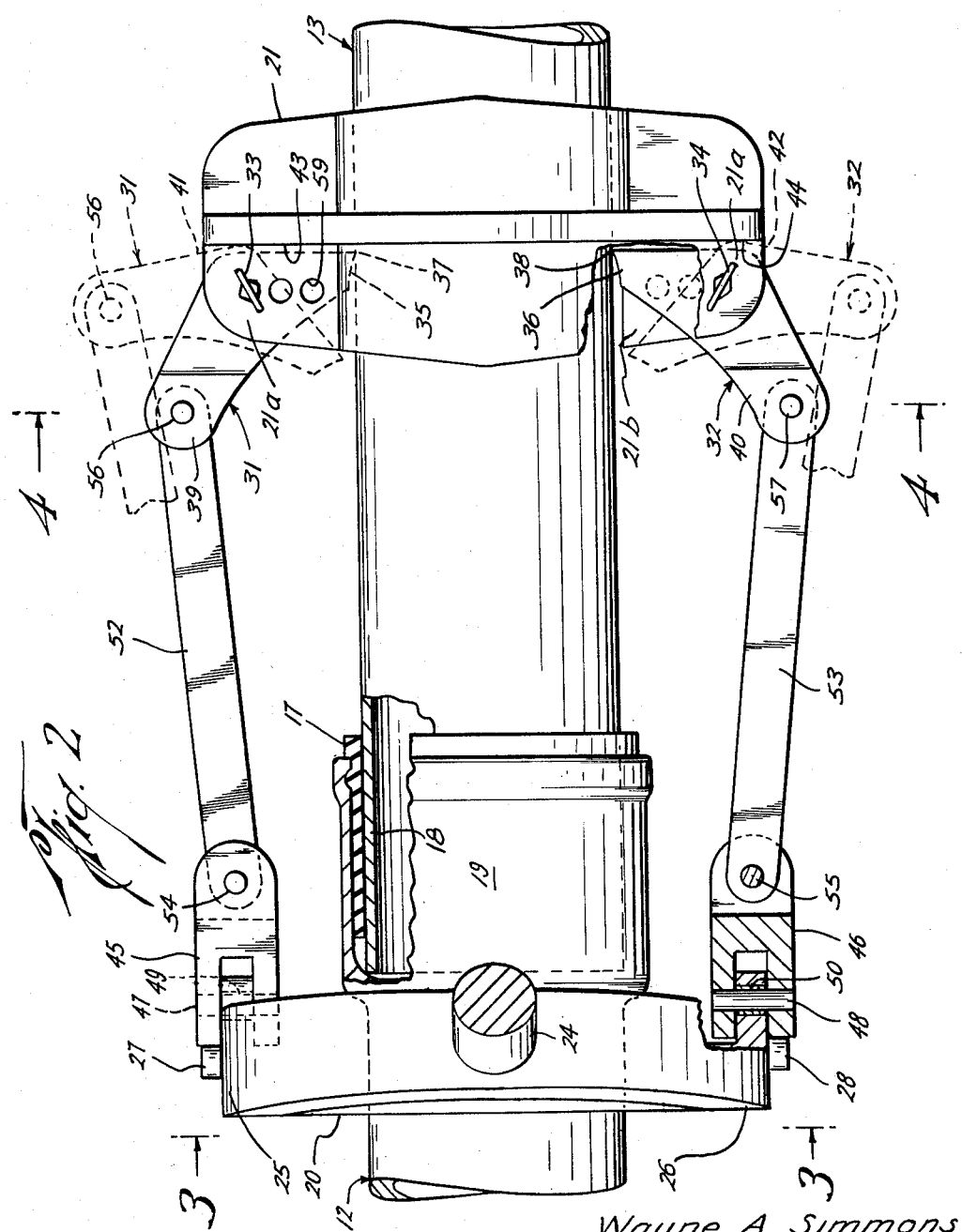

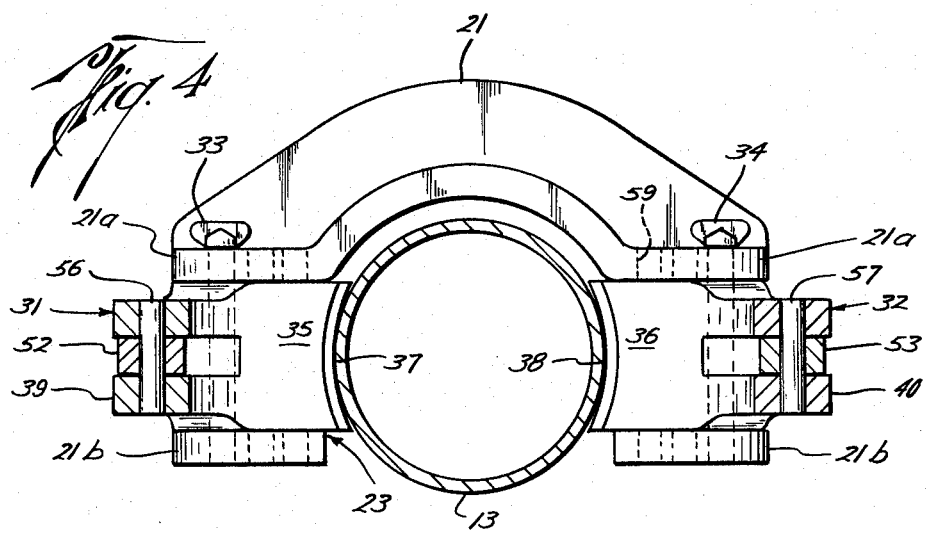
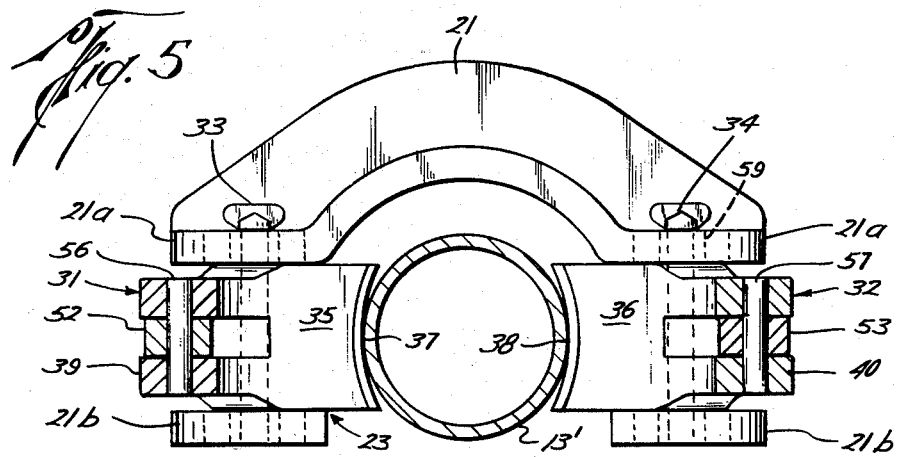
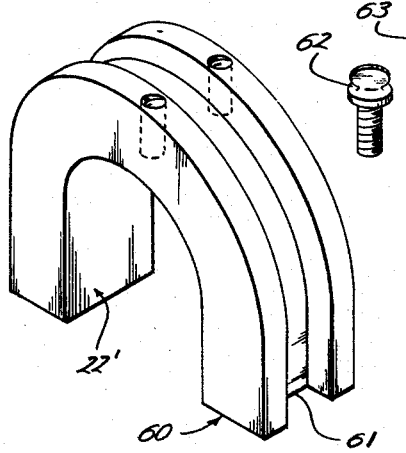
Wayne A. Simmons
INVENTOR.
BY
ATTORNEYS

United States Patent Office 3,096,572
Patented July 9, 1963

3,096,572
PIPE JOINT FABRICATING TOOL
Wayne A. Simmons, Lindale, Tex., assignor to Tyler Pipe and Foundry Company, Tyler, Tex., a corporation of Texas
Filed July 24, 1961, Ser. No. 126,178
3 Claims. (Cl. 29—237)

This invention relates to a pipe joint fabricating tool, and more particularly to a device for assembling pipes having telescoping bell and spigot type joints, employing a resilient gasket type of seal and lock.

Cast iron soil pipes are in very common use at present and the telescoping bell and spigot type of joint between individual lengths of such pipe provides the usual means of joining such pipe into fluid carrying lines. Formerly, the bell and spigot type joint was assembled, caulked with oakum or the like, and then leaded to provide a fluid tight seal and also to mechanically lock the pipes together with the desired rigidity. Because of the many disadvantages of the caulked and leaded seal, especially its high cost and the time, labor and equipment required to complete the joint, the use of an annular resilient gasket interposed between the bell and spigot ends of the pipe joint to form the fluid tight and mechanically rigid connection therebetween has recently come into commercial use.

In assembling bell and spigot type joints with such gaskets, the gasket is installed within the bell end of one pipes and its interior surface is lubricated. The other joint member or spigot is aligned with the first pipe and the spigot inserted into the bell end. Because of the nature of the gasket seal, the insertion of the spigot into the gasket contained in the bell end requires considerable force. More force is required than workmen can readily exert directly thereon and therefore some device that provides a considerable mechanical advantage must be used to force the pipes lengthwise together. The device should apply little, if any, lateral force to the pipes as they are moved lengthwise toward one another; otherwise, they will be misaligned, which can cause the gasket to collapse and possibly make a faulty joint.

Most commonly, these joints must be assembled on the bottom of a trench formed within the earth. In order to reduce the costs in laying such lines, the width of such trench is uniform throughout its length and must be reduced to a minimum dimension, generally only of such width that a worker can stand upright on the bottom of the trench. Thus, the device used to assemble the pipe joints should be of a small and compact size to be operable in such minimum width trench. Also, it should be adapted to be placed over the pipe from one of its sides or its bottom or top only and should not require a support other than the pipes which are to be assembled to form the desired telescoping joint. The assembly of certain types of connections requires that the length of the device also be extremely small. Further, on the usual construction site where such pipe is being installed, the device is subject to extremely rough service because of the dirt, sand, debris and water which accumulates about such pipes in the trench where it is being assembled.

The heretofore known devices, especially the types of devices that have complex operable elements, including parts requiring precision tolerances, have not been found to meet the above requirements for assembling bell and spigot joints in cast iron pipe where a resilient gasket forms a fluid seal and mechanically locks the pipes into a rigid connection in the above-described rough service.

It is therefore an object of the present invention to provide a device for properly assembling pipes with joints of the type described that is simple to operate, durable and easily constructed without precision tolerances on any part.

Another object is to provide such device that is eminently suited for joining pipes in rough service where dirt, sand, debris and water are encountered, especially in deep trenches that have a narrow width.

Yet another object is to provide such device that is placed into operable position over the pipes to be joined from one side or the top or bottom thereof and where such pipes provide the sole support for operably positioning the device.

A further object is to provide a device that anchors to the bell end of a pipe and grips the spigot end of a second pipe in a manner that only lengthwise forces are applied thereto to assemble the joint between the bell and spigot ends of the pipes.

Yet a further object is to provide a device in which the same set of jaws can be used with different sizes of pipe but in which end jaws are self-aligning on any size of pipe so that no unbalanced lateral forces such as would tend to misalign the pipe are applied to any size of pipe gripped by the jaws.

Another object is to provide such device with pipe gripping members that sweep the pipe clear of debris at the location where it is to be gripped.

A further object is to provide such device where the oscillation of an operating member moves the pipe gripping members into and out of pipe engaging positions in timed relationship to their longitudinal movement along the pipe so that the wearing of the pipe gripping members by being scraped along the side exterior surface of the pipe is avoided.

These and other objects will become apparent as the description proceeds.

In the drawings, wherein the same parts will be designated by like numerals in the various views:

FIG. 1 is a longitudinal section through a trench formed in the earth wherein reside two lengths of pipe joined together by a bell and spigot type joint with the device of the present invention operably mounted over the joint, the lengths of pipe and said device being shown in elevation;

FIG. 2 is an enlarged plan view of the device and pipes shown in FIG. 1 with portions broken away and shown in section;

FIG. 3 is a sectional view taken along line 3—3 of FIG. 2;

FIG. 4 is a sectional view taken along line 4—4 of FIG. 2;

FIG. 5 is a sectional view like FIG. 4 but with a smaller diameter pipe than that shown in FIG. 4 gripped by the jaws; and FIG. 6 is a perspective view of a sizing stirrup or adapter used with smaller diameters of pipe adjacent the bell end.

Referring to the drawings, an illustrative embodiment of the present invention shown therein will be described.

In FIG. 1, there is shown a device 11 in a typical environment wherein it is used to assemble bell and spigot type joints between lengths of cast iron soil pipe. The pipes 12 and 13 shown as having been joined by use of this device, are shown resting on chocks 14 on the bottom 15 of a trench 16 formed in the earth. The trench 16 has a depth to insure safe burial of the pipeline and a width as narrow as possible, usually only of a size sufficient to accommodate a workman.

The joint is illustrated in FIG. 2 as formed by an annular resilient gasket 17 interposed between the bell end 19 and spigot end 18 of cast iron soil pipe.

The device of the present invention includes an anchor means to receive a pipe such as pipe 12 and abut against the shoulder of its bell 19, a carrier carrying pivotally mounted pipe engaging members or dogs to receive and grip pipe 13 at a position spaced from its spigot 18, an operating lever pivoted to the anchor means, and linkage means interconnecting the lever and pipe engaging members, whereby oscillation of the operating lever with alternate pushing of the carrier along the pipe will jack the pipes toward each other and assemble the pipe joint.

More particularly, the device 11 includes a first yoke 20 and a second yoke 21 disposed, in use, in approximate parallelism to and in axial alignment with each other. The yoke 20 has a pipe receiving laterally open slot 22 therein to receive pipe 12 and abut against the shoulder of bell 19 to anchor yoke 20 against movement along pipe 12 toward pipe 13. The yoke 21 also has a pipe receiving laterally open slot 23 to receive pipe 13 adjacent but spaced from the spigot 18. The pipe receiving slots 22 and 23 are oriented so that their lateral openings face in the same lateral direction.

An operating lever 24 has on one end parallel arms 25 and 26 providing a lever yoke which straddles yoke 20 and extends from yoke 20 in a direction opposite the lateral opening of its slot 22. The ends of arms 25 and 26 are pivotally connected to the extremities of yoke 20 by means of coaxial machine screws 27 and 28 passing through the arms and threadedly secured in the respective arms of yoke 20. Pivot bushings 29 and 30 may be used, if desired, to surround the threaded portion of the threads of screws 27 and 28 to provide antifriction bearings thereon. The rotative axis of the screws 27 and 28, which provide a pivotal mounting of lever 24 to yoke 20, is transverse to the axis of pipe 12 and preferably falls on the same side thereof as the lateral opening of the slot 22 in the yoke 20. Thus, any pull transmitted to yoke 20 from the lever 24 through the screws 27 and 28 in a direction longitudinally of the pipe will tend to hold the yoke 20 more firmly in place on the pipe.

The second yoke 21 forms a carrier movable lengthwise on pipe 13 and to which pipe engaging and gripping members or dogs 31 and 32, in the form of obtuse angle bell cranks, are pivoted. The pipe gripping members 31 and 32 are pivoted to the yoke 21 on opposite sides of the slot 23 for oscillation about axes preferably approximately parallel to each other and approximately normal to the axis of pipe 13, by means of readily removable pivot pins 33 and 34 passing through parallel flanges 21a and 21b formed on opposite sides of the slot 23 of the yoke 21, on that face of yoke 21 which faces toward yoke 20. The pipe gripping members are each provided with a pipe engaging end shown at 35 and 36 respectively, extending generally toward the other member and which has teeth shown at 37 and 38 respectively, for engaging the pipe 13 when the pipe engaging members are rotated from the dotted line position to the solid line position, as shown in FIG. 2.

The outwardly projecting ends 39 and 40 of pipe gripping members 31 and 32 are disposed at an obtuse angle from the jaws 35 and 36 as seen in FIG. 2. When the pipe gripping members 31 and 32 are rotated out of a pipe gripping position, their projecting ends 39 and 40 will move to the dotted line positions of FIG. 2 and be stopped from further rotation by the engagement of surfaces 41 and 42 thereon against surfaces 43 and 44 on second yoke 21.

In order to reciprocate the yoke 21 lengthwise on pipe 13 and that wearing of the jaws 35 and 36, due to their scraping along pipe 13, be avoided, the following structural arrangement is utilized to move the jaws 35 and 36 into and out of pipe gripping positions in timed relationship to lengthwise movement of second yoke 21 along pipe 13. Further, such structure insures that for all practical purposes no unbalanced lateral forces will be applied to the pipe 13 by the jaws and that only lengthwise forces are applied to insert spigot 18 into the gasket 17 in the bell 19 to assemble the desired joint. This structure is provided by linkage means comprised of toggle links 45 and 46 pivoted to arms 25 and 26 of operating lever 24 at locations spaced from the pivotal connection of lever 24 to yoke 20. These pivots are provided by coaxial pins 47 and 48 passing through the toggle links 45 and 46 and arms 25 and 26, respectively. Fulcrum bushings 49 and 50 may be utilized to provide antifriction bearings about the journal connections in the arms if desired. The rotative axis of such pivots will move along an arcuate surface 51 as the lever 24 is oscillated about its journal mounting on yoke 20. Because of the location and proportions of the various parts, this arcuate surface throughout its length lies very close to the axis of a pipe 12 received within yoke 20. Thus, substantially all forces applied at this pivot are lengthwise along the axis of pipe 12.

The toggle links 45 and 46 are, in turn, connected to the outer ends of the pipe gripping members 31 and 32 by links 52 and 53. These links 52 and 53 are pivotally connected by pins 54 and 55 to the toggle links 45 and 46 and by pins 56 and 57 to the outwardly projecting ends 39 and 40 of the pipe gripping members 31 and 32. The rotative axes of pins 54 and 55 are approximately normal to the common axis of pins 47 and 48 so that a universal connection is provided for transmitting lengthwise forces from the operating lever 24 to the links 52 and 53. The pivotal connections between links 52 and 53 and the pipe gripping members 31 and 32, respectively, are located on opposite sides of the axis of pipe 13 and approximately on a straight line through said axis and equidistant therefrom when jaws 35 and 36 engage pipe 13. By this arrangement, when the linkage means are of equal length, the pipe engaging members 31 and 32 will be operated in unison so that the resultant forces applied by jaws 35 and 36 will be always lengthwise on pipe 13 and not lateral thereto.

When lever 24 is moved to the left, as seen in FIG. 1, its initial movement will act through the linkage means 45, 46, 52 and 53 initially to pivot the pipe engaging members 31 and 32 about the pivots 33 and 34 and swing the jaws 35 and 36 into pipe engaging positions to securely grip the pipe 13 and then to pull the second yoke 21 toward the first yoke 20 thereby moving the spigot 18 into the gasket 17 in the bell 19 to assemble the joint between the pipes 12 and 13. When the lever 14 is moved to the right, its initial movement will act through the linkage means 45, 46, 52 and 53 to rotate the pipe engaging members 31 and 32 and swing the jaws 35 and 36 out of pipe gripping positions and then to push the yoke 21 away from yoke 20 because of engagement between surfaces 41, 42 and 43, 44. Thus, oscillation of lever 24 back and forth will first cause the pipe engaging members to grip the pipe 13 and move it lengthwise toward pipe 12 to assemble the joint and then cause these pipe engaging members to release the pipe 13 and move the yoke 21 freely in a reverse direction along the pipe 13 away from the spigot without dragging therealong so that the pipe can be gripped at a location further from the joint and the operation repeated. This repeated motion of the lever 24 enables the pipes 12 and 13 to be drawn together in a very limited space such as is usually available in a trench 16. Because of the slot-ways 22 and 23 in yokes 20 and 21, the device 11 may be readily placed over a pair of pipes 12 and 13 from one side or the top thereof and operated to assembly the joint; and, when desired, the device is easily lifted from the pipes. An extension 58 may be placed over the end of lever 24 so that the device may be operated from a position remote from the pipes if desired. Such extension also provides a greater mechanical advantage for forcing the pipes toward each other.

When the pipe engaging members 31 and 32 are moved from a pipe engaging position, the yoke 21 will rest directly upon the upper surface of pipe 13. Because of debris and the like that may be on the pipe, the spacing between the yoke 21 and the axis of the pipe 13 may vary and therefore cause misalignment of the jaws 35 and 36 when gripping such pipe. In order to insure that jaws 35 and 36 will grip pipe 13 with laterally balanced forces despite such misalignment of yoke 21, they are provided with automatic centering means in the form of arcuate pipe confronting surfaces 37 and 38 which are of a radius at least equal to the outside radius of the larger size of pipe to be gripped.

As can be best seen in FIG. 4, these arcuate surfaces automatically center the jaws and yoke 21 on the pipe when the pipe 13 is gripped. This automatic centering feature is an important advantage of the present invention because it insures that the jaws always grip pipe 13 on opposite sides of and in alignment with the pipe axis so that only lengthwise forces are applied thereto.

Referring to FIG. 5 wherein the operation of jaws 35 and 36 is shown with a smaller diameter pipe 13' than that in FIG. 4, the arcuate surfaces of jaws 35 and 36 automatically align the pipe gripping members 31 and 32 with the axis of the pipe 13' and elevate yoke 21 thereabove so that the only substantial resultant force applied thereto by links 52 and 53 is lengthwise on the pipe 13' in a horizontal plane. Of course, when the pipe gripping members are rotated out of a pipe gripping position with pipe 13', the yoke 21 will rest upon the upper surface of the pipe and slide thereon when the yoke 21 is pushed away from yoke 20 by operation of lever 24. Thus, jaws 35 and 36 only engage the pipe when they need to grip it; at all other times there is sliding contact between yoke 21 and the pipe 13' so that no unnecessary wearing of the jaws occurs. This insures long jaw life since they cannot be scraped along the side exterior surface of the pipe.

Because of the rough service conditions where dirt, sand, debris and water are encountered, the present invention is of especial utility inasmuch as no parts are required to have precision tolerances or to depend on accuracy or freedom from debris of sliding surfaces for their operation. Further utility is provided in the jaws 35 and 36 of the present invention by making the arcuate surfaces 37 and 38 beveled to provide an undercut surface facing the yoke 20 so that as jaws 35 and 36 are swung into pipe engaging position by rotation of the pipe gripping members 31 and 32, any debris on pipe 13 is cut away to provide a clean area in which jaws can grip the pipe. This, of course, greatly increases the useful life of the jaws and reduces the possibility of foreign matter being jammed between the jaws and pipe to prevent their proper operation.

Referring to FIG. 2, the pivotal connection of the pipe gripping members 31 and 32 to yoke 21 is arranged to be readily adjustable so that the same set of jaws can be used for pipes which have different outside diameters with equal utility. The flanges 21a and 21b are provided with a plurality of aligned openings 59 that have axes normal to the axis of pipe and parallel to each other, but which are spaced at various distances from such pipe axis. These openings are adapted to receive pins 33 and 34 whereby the pipe engaging members 31 and 32 can be moved equal distances toward or from the pipe axis so as to properly accommodate different sizes of pipe on which the device 11 is to be used. As the pins 33 and 34 are moved away from each other, from FIG. 2 it is obvious that the angle formed between the jaws 35 and 36 and the links 52 and 53 is decreased so that the larger the pipe gripped, the greater the force with which the jaws are urged against it for the same force applied to the lever 24. Thus, the force with which the jaws grip a pipe is automatically adjusted to increase in proportion to the pipe's diameter. It follows that the larger the pipe the greater the lengthwise forces that can be applied to the pipe by this mechanism without danger of slippage between the jaws and the exterior side surface of the pipe.

The first yoke 20, of course, will not receive pipes of different diameters in its slot-way 22 without positioning the axis of each size pipe at a different depth in the slot-way. Therefore, an adapter is utilized to insure that the pivotal connection of the linkage means to the operating lever will, for different sizes of pipe, occupy the same position relative to the axis of the pipe received with the yoke 20. The adapter 60 may take the form of a sizing stirrup, as seen in FIG. 6, of an outer size to fit within the slot-way 22, and is provided with a slot-way 22', smaller than but open in the same lateral direction as slot-way 22, to receive a pipe of a desired size smaller than one which will fit in slot-way 22. This adapter will abut against the shoulder of the bell of such smaller pipe. The exterior side surface of the adapter 60 is provided with a relieved portion 61 of a size to receive yoke 20. Wing bolts 62 and 63 may be provided to releasably secure the yoke 20 to adapter 60. Thus, the anchor means to which is pivoted the lever 24 is readily adapted to be used with a plurality of pipes of varying size and the novel device is usable with equal utility on more than one size of pipe.

The device 11 is used in the following manner to assemble the telescoping joint between pipes 12 and 13. Assuming pipe 12 has been previously connected into an existing pipeline in trench 16 and is relatively stationary for all practical purposes, gasket 17 is inserted into bell 19 of pipe 12 and the interior surface of the gasket is lubricated to facilitate assembly of the joint. The pipe 13 is placed into substantial alignment with pipe 12 and rests on chocks 14 in the bottom 15 of trench 16. The device 11 is placed over the joint with yoke 20 anchored behind bell 19 on pipe 12 and yoke 21 resting over pipe 13 adjacent but spaced from spigot 18. Operating lever 24 is oscillated alternately to rotate the jaws into engagement with pipe 13 and pull yoke 21 toward yoke 20 to move the spigot 18 into bell 19 and to rotate the jaws out of engagement with pipe 13 and make it possible to push yoke 21 away from yoke 20 along pipe 13 so that pipe 13 can be gripped at a location further from the spigot 18 and moved lengthwise toward pipe 12. The lever 24 is oscillated and the yoke 21 pushed away from yoke 20 after each oscillation until the desired insertion of spigot 18 into bell 19 is obtained after which the device 11 may be lifted from the pipes. The workman operating device 11 need not make any adjustment thereto or to the pipes during such assembly of the desired joint because of the structure of the present invention insures proper assembly of the joint merely by oscillation of the operating lever and pushing of yoke 21 away from yoke 20.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for assembling pipes having bell and spigot type joints comprising, first and second spaced apart yokes disposed in approximate parallelism to and in axial alignment with each other and having slot-ways therein respectively opening in the same lateral direction, the slot-way of the first yoke being of a size to receive a pipe and abut against the bell end thereon, the slot-way of the second yoke being of a size to receive a pipe adjacent its spigot end, an operating lever having a bifurcated end providing parallel arms which are disposed over the first yoke with the opening between said arms facing in the same lateral direction as the opening of said yokes, said arms being pivoted to the extremities of said first yoke respectively on a single pivotal axis transverse to the axis of a pipe received in the slot-ways, pipe gripping members each having a pipe gripping end and an end remote therefrom and being pivotally mounted intermediate their ends on the second yoke on each side of its slot-way with their pivotal axes approximately parallel to one another and transverse to the axis of said second yoke for rotation into and out of pipe engaging positions of said gripping ends with respect to a pipe positioned in the slot-way of said second yoke, and linkage means disposed on opposite sides of said slot-ways and pivoted respectively to each arm of the lever on a single axis parallel to the pivotal axis of the connection of said lever to said first yoke and spaced therefrom, said linkage means being also connected with the ends of the pipe gripping members remote from their pipe engaging ends whereby displacement of the operating lever in one direction initially pivots the pipe gripping members into pipe engaging positions and then pulls the second yoke toward the first yoke while displacement of the lever in an opposite direction initially pivots the pipe gripping members out of pipe engaging positions and releases the second yoke to permit it to be moved away from the first yoke.

2. A device for assembling pipes having bell and spigot type joints comprising, an anchor means and a carrier in spaced relationship and in axial alignment with each other, and adapted to be placed as a unit in a position bridging the bell and spigot ends of two aligned pipes to be joined together and in a direction transverse to the pipe axis with the anchor means abutting against the bell end of one pipe and the carrier residing on the other pipe adjacent and spaced from its spigot end, an operating member pivoted to said anchor means for pivotal movement relative thereto, linkage means pivoted to the operating member at a location thereon spaced from the pivotal connection of the operating member to the anchor means, said pivotal connection of the linkage means being on a pivotal axis transverse to and passing closely adjacent the axis of a pipe received within the anchor means, opposed pipe gripping members having pipe engaging portions and pivoted to the carrier for rotation about axes normal to the axis of a pipe received within the carrier for pivotal movement into and out of pipe gripping positions, said pipe gripping members having their pipe engaging portions in the form of jaws having an arcuate surface of a radius as large as the outside radius of the pipe to be gripped, said pipe gripping members having ends remote from said jaws pivoted to said linkage means, said latter pivoted connection being on opposite sides of the axis of a pipe in position to be gripped by the jaws of the pipe gripping members, whereby oscillating said operating member alternatley pivots the pipe gripping members to swing the jaws into pipe gripping positions and pulls the carrier toward the anchor means, and pivots the pipe gripping members to swing the jaws out of pipe gripping positions to release the carrier to permit it to be moved away from the anchor means.

3. The device of claim 2 wherein the jaws are beveled to provide an undercut surface facing the anchor means so that as the jaws swing into pipe engaging positions any debris encountered thereby on the pipe to be gripped is cut away.

References Cited in the file of this patent

UNITED STATES PATENTS

| | | |
|---|---|---|
| 1,028,523 | Anderson | June 4, 1912 |
| 2,958,125 | Nichols | Nov. 1, 1960 |